US006819355B1

(12) United States Patent
Niikawa (10) Patent No.: US 6,819,355 B1
(45) Date of Patent: Nov. 16, 2004

(54) COMPUTER MANIPULATABLE CAMERA AND COMPUTER, COMPUTER PRODUCT AND SYSTEM FOR MANIPULATING CAMERA

(75) Inventor: Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/270,833

(22) Filed: Mar. 18, 1999

(30) Foreign Application Priority Data

Mar. 18, 1998 (JP) ............................................ 10-068959

(51) Int. Cl.[7] ......................... H04N 5/225; H04N 11/00
(52) U.S. Cl. .............................. 348/207.11; 348/222.1; 348/333.02; 348/552
(58) Field of Search ..................... 348/207.99, 207.1, 348/207.11, 211.99, 211.4–211.9, 222.1, 231.99, 231.3, 231.6, 231.7, 333.01, 333.02, 333.04, 333.05, 333.11, 333.12, 333.13, 552

(56) References Cited

U.S. PATENT DOCUMENTS

| | | | | |
|---|---|---|---|---|
| 5,402,170 A | * | 3/1995 | Parulski ...................... | 348/552 |
| 5,479,206 A | * | 12/1995 | Ueno et al. ............... | 348/211.5 |
| 5,675,358 A | * | 10/1997 | Bullock ....................... | 345/420 |
| 5,999,213 A | * | 12/1999 | Tsushima et al. ........... | 348/180 |
| 6,005,613 A | * | 12/1999 | Endsley ...................... | 348/552 |
| 6,188,431 B1 | * | 2/2001 | Oie ......................... | 348/333.05 |
| 6,208,379 B1 | * | 3/2001 | Oya ....................... | 348/211.11 |
| 6,313,877 B1 | * | 11/2001 | Anderson .............. | 348/333.05 |

FOREIGN PATENT DOCUMENTS

| | | | | |
|---|---|---|---|---|
| JP | 07044477 | 2/1995 | ........... | G06F/13/10 |
| JP | 09163209 | 6/1997 | .......... | H04N/5/225 |
| JP | 9-270944 | 10/1997 | .......... | H04N/5/225 |
| JP | 09289631 | 11/1997 | ............. | H04N/7/14 |
| JP | 09326799 | 12/1997 | ........... | H04L/12/28 |

* cited by examiner

Primary Examiner—Ngoc-Yen Vu
(74) Attorney, Agent, or Firm—Burns, Doane, Swecker & Mathis, L.L.P.

(57) ABSTRACT

A camera system comprises a camera for photographing an object and acquiring image data of the object, a computer having a connector which allows the camera to be connected to the computer, a mode setting device provided to the camera and for setting an operation mode of the camera, a display which functions together with the computer, and a controller provided to the computer. The controller detects a connection between the camera and the computer via the connector, and causes an image representing the mode setting device and an image representing a display panel for displaying the image taken by the camera to be displayed upon detection of the connection. When the computer is manipulated for setting a mode through the image representing the mode setting device, the controller supplies an instruction signal for setting the selected mode to the camera, and the camera sets the mode in response to the instruction supplied from the controller.

31 Claims, 10 Drawing Sheets

RADIO BUTTON 1
RADIO BUTTON 2

RADIO BUTTON 3
RADIO BUTTON 4

COMPUTER MANIPULATABLE CAMERA AND COMPUTER, COMPUTER PRODUCT AND SYSTEM FOR MANIPULATING CAMERA

The present invention claims priority based on the Japanese Patent Application No. H10-68959, the contents of which are incorporated hereinto by reference in its entirety.

BACKGROUND OF THE INVENTION

1. Field of the Invention

This invention relates to a camera for photographing an object and acquiring image data of the object, and to a camera system combined with a computer having a connector which allows a camera to be connected with the computer. The invention also relates to a camera, a computer, and a recording medium used in said system.

2. Description of the Related Art

Image data taken by a digital camera is typically loaded into a computer using an image loading software (or a driver software) for the digital camera. The image taken into the computer is processed, printed, or recorded using an application software in the computer. Some camera systems allow the live view image being taken by the digital camera to be displayed on the monitor screen of the computer with help of the driver software, or allows the shutter of the digital camera to be actuated from the driver software side.

Japanese Unexamined Laid-Open Patent Publication No. H9(1997)-270944 discloses a camera system in which a digital camera is connected to a TV monitor or a computer. With this system, when the digital camera is connected to the computer, the display screen of the digital camera, on which the photographed image is displayed, can be turned on and off from the computer side.

However, the conventional camera system requires complicated manipulation by the user in order to operate the digital camera from the computer side, and the operation system used in the conventional camera system is not user-friendly. Even if some driver softwares are available, these driver softwares are not designed so as to allow the user to manipulate the digital camera easily through the computer by intuition. Besides, the operation of the driver software itself is not easy for a beginner.

SUMMARY OF THE INVENTION

Therefore, it is an object of the present invention to provide a camera system in which a digital camera and a computer are connected to each other, and which allows the digital camera to be easily manipulated from the computer side.

It is another object of the present invention to provide a camera system which allows the user to set a camera mode easily.

It is still another object of the present invention to provide a camera suitably used in the camera system.

It is yet another object of the present invention to provide a system for allowing the camera used in the camera system to cooperate with a computer.

It is still another object of the present invention to provide a recording medium suitably used in the camera system.

It is still another object of the present invention to provide a computer suitably used in the camera system.

In order to achieve the objects, in one aspect of the present invention, a camera system comprising a camera for photographing an object and acquiring image data of the object; a computer having a connector which allows the camera to be connected to the computer; a mode setting device provided to the camera and for setting an operation mode of the camera; a display which functions together with the computer; and a controller provided to the computer, the controller detecting a connection between the camera and the computer via the connector, and causing an image representing the mode setting device and an image representing a display panel for displaying the image taken by the camera to be displayed on said display upon detection of a connection. When the computer is manipulated for setting a mode based the image representing the mode setting device, the controller supplies an instruction for setting the mode to the camera. The camera sets the mode in response to the instruction supplied from the controller.

With this system, the user can set a desired mode of the camera which is connected to the computer by manipulating the display screen of the computer, without requiring complicated operations of the computer. The user can set the mode of the camera easily and conveniently as if setting the mode directly on the camera.

If the controller detects a connection between the camera and the computer, the controller causes the picture of the mode setting device of the camera to be displayed on the display screen of the computer, through which the user can select and set a desired mode.

BRIEF DESCRIPTION OF THE DRAWINGS

The above and other objects, features, and advantages of the present invention will be apparent from the following detailed description of the preferred embodiments with reference to the attached drawings, wherein.

DESCRIPTION OF THE PREFERRED EMBODIMENTS

First, the structure of the digital camera will be explained.

<Structure of Digital Camera>

Figure 1:
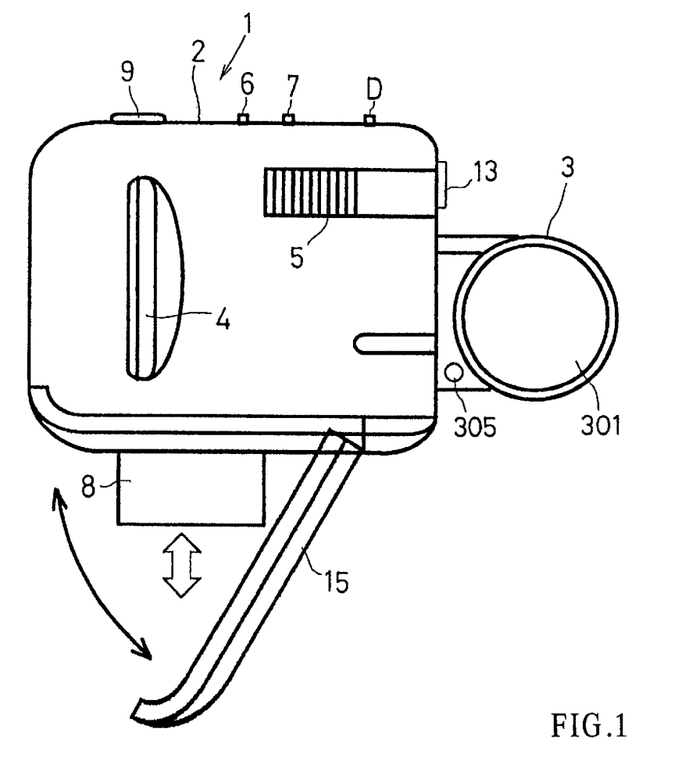
FIG. 1 is front view of the digital camera used in the camera system according to an embodiment of the present invention.
Figure 2:
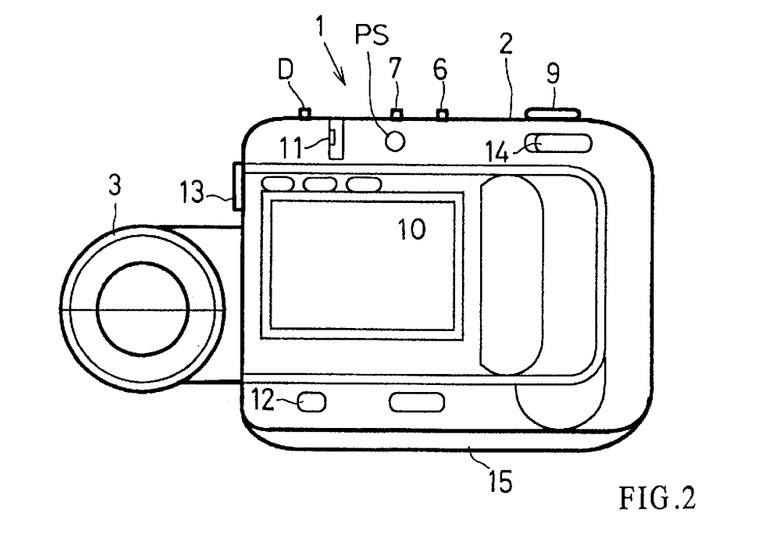
FIG. 2 is a rear view of the digital camera shown in FIG. 1.
Figure 3:
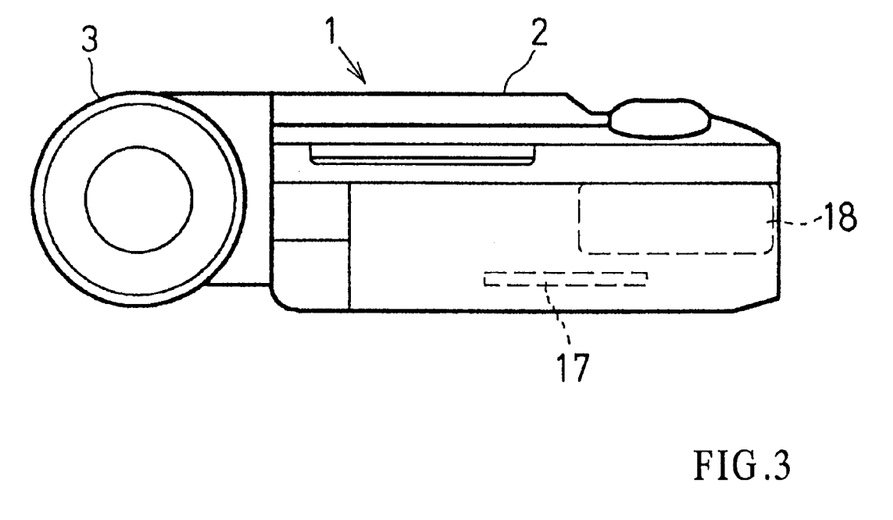
FIG. 3 is a bottom view of the digital camera shown in FIG. 1.

As shown in FIGS. 1–3, a digital camera 1 comprises a camera frame, which is referred to as a main body 2, and a photographing unit 3 which is attachable to and removable from the main body 2 on the right side of the main body 2 in the front view shown in FIG. 1. The photographing unit 3 is pivotable within a plane parallel to the right side of the main body 2.

The photographing unit 3 has an image pick-up device comprising a zoom lens 301 and a photoelectric conversion device such as a CCD (Charge Coupled Device) array, to convert the optical image of an object into an electric image consisting of charge signals, each of which was generated by each pixel of the CCD via photoelectric conversion. The main body 2 has a display or LCD (Liquid Crystal Display) 10, a slot 17 for receiving a memory card 8, and a connection terminal 13 for connecting the digital camera to the personal computer. The image signal taken by the photographing unit 3 is subjected to a prescribed image processing in the main body 2. The processed image is displayed on the LCD display 10, recorded into the memory card 8, or transferred to the personal computer.

A zoom lens 301 is provided in the photographing unit 3. An image pick-up circuit including a CCD color area sensor 303 is located at an appropriated position behind the zoom lens 301. A light adjusting circuit 304 having a photo sensor 305 for receiving flash light reflected from the object is provided at an appropriated position in the photographing unit 3.

As shown in FIG. 1, a grip 4 is formed in the left-hand upper side of the front face of the camera main body 2, and a built-in flash device 5 is provided in the right-hand upper side at an appropriate position. Frame access switches 6 and 7 are provided near the center of the top face of the main body 2 as shown in FIG. 2. The switch 6 feeds the frame in the direction that the frame number increases in the photographed order, and is referred to as an UP key 6. The switch 7 feeds the frame in the direction that the frame number decreases, and is referred to as a DOWN key 7. A delete key D for deleting the images recorded in the memory card 8 is provided on the left of the DOWN key 7, and a shutter button 9 is provided on the right of the UP key 6 in the rear view shown in FIG. 2.

As shown in FIG. 2, an LCD 10 is provided in the middle of the left-hand side of the rear face of the camera main body 2. The LCD 10 functions as a view finder during photographing, and as a display during the reproduction of the recorded image. A compression rate setting slide switch 12 for switching the compression rate K of the image date to be recorded in the memory card 8 is positioned below the LCD 10. The connection terminal 13 is positioned on the side face of the main body 2 near the photographing unit 3. A power switch PS is provided on the top of the rear face of the main body 2.

The flash device (which may be abbreviated as FL) of the digital camera 1 has an "automatic flash mode", a "forcible flash mode", and a "flash prohibition mode". In the "automatic flash mode", the built-in flash device 5 automatically emits flash light according to the luminance of the object. In the "forcible flash mode", the built-in flash device 5 forcibly emits flash light regardless of the luminance of the object. In the "flash prohibition mode", light emission of the built-in flash device 5 is prohibited. Every time the user presses the FL mode setting key 11 positioned above the LCD 10 on the rear face of the main body 2, the flash mode is switched among three modes in a cyclic order. The digital camera 1 has a 1/8 compression rate and a 1/20 compression rate, and the user can select the preferred compression rate K. For example, if the compression rate setting switch 12 is shifted to the right, the compression rate K is set to 1/8, and if it is shifted to the left, the compression rate K is set to 1/20. Although, in this embodiment, the compression rate K is set to two values, it may be set to three or more values.

A photographing/reproduction mode setting switch 14 is positioned at the top right of the rear face of the main body 2. Digital pictures are taken in the photographing mode. In the reproduction mode, the digital images recorded in the memory are reproduced and displayed on the LCD 10. The photographing/reproduction mode setting switch 14 is also a bicontact slide switch. For example, if the switch is shifted to the right, the reproduction mode is selected, and if shifted to the left, the photographing mode is selected. If a slide switch is employed as a switch which is frequently used to change the modes, the user can easily recognize the set mode, which is more friendly to the user.

A FL mode setting switch 11, the UP key 6, the DOWN key 7 and the shutter button key are a push switch, respectively.

A card insertion slit 17 for receiving the memory card 8 and a battery cavity 18 are positioned on the bottom face of the main body 2. The slit 17 and the battery cavity 18 are covered with a clam-shell type cover 15. The digital camera 1 is loaded with a power supply source E consisting of four AA battery cells connected in series.

Figure 4:
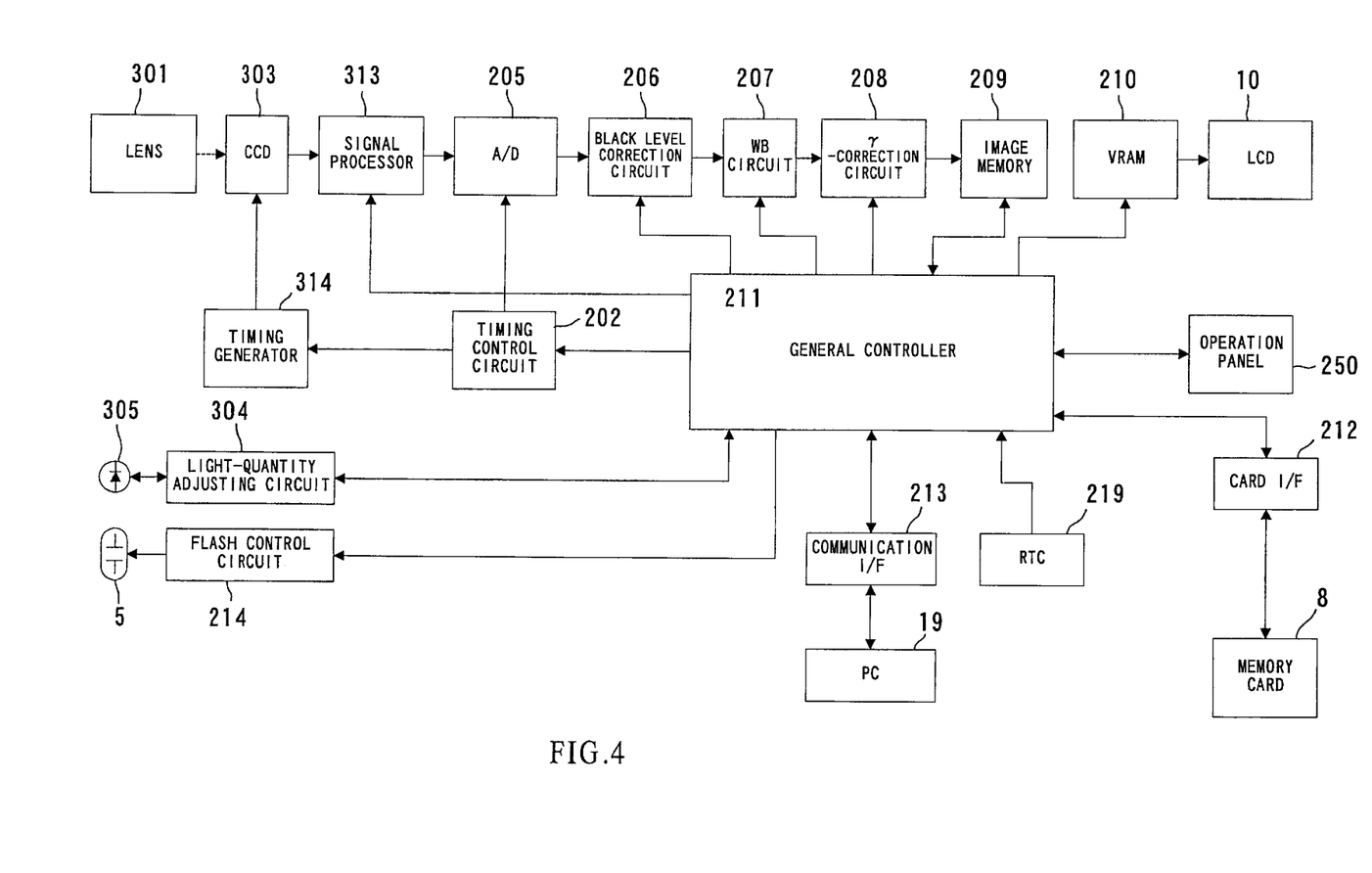
FIG. 4 is a block diagram of the control system of the digital camera shown in FIGS. 1 through 3.

FIG. 4 is a block diagram of the control system of the digital camera 1.

The CCD 303 in the photographing unit 3 photoelectrically converts the optical image of the object focused by the macrozoom lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the photographing unit 3 is fixed, the exposure of the photographing unit 3 is controlled by adjusting the quantity of exposure of the CCD 303, that is, the charge accumulation time of the CCD 303, which correspond to the shutter speed. If the luminance of the object is too low to select to an appropriate shutter speed, the level of the image signal output from the CCD 303 is adjusted in order to compensate for the insufficient exposure. In other words, at a low luminance, the exposure is controlled by adjusting both the shutter speed and the gain. The level of the image signal is adjusted by controlling the gain of the AGC circuit in the signal processor 313.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels. These timing signals are supplied to the CCD 303.

The signal processor 313 applies prescribed analog signal processing to the analog image signal output from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 controls the light emission of the built-in flash device 5 to a predetermined level determined by the general controller 211 when the flash device is used during the photographing. During the flash photographing, the flash light reflected from the object is received by the photo sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 stops the light emission of the built-in flash device 5, whereby the light emission amount of the built-in flash device 5 can be regulated to the prescribed level.

The A/D converter 205 provided in the main body 2 of the digital camera 1 converts each pixel signal (i.e., analog signal) of the image signal sequence into a 10-bit digital signal based on the A/D conversion clock supplied from the A/D clock generator (not shown).

A reference clock/timing generator 314 and a timing control circuit 202 are also provided in the main body 2. The timing control circuit 202 is controlled by the general controller 211, and generates a clock for the A/D converter 205.

A black level correction circuit 206 corrects the black level of the digitalized pixel signal (hereinafter referred to as pixel data) converted by the A/D converter 205 to the reference black level. A white balance circuit (hereinafter referred to as WB circuit) 207 converts the level of the pixel data of each color component of R, G or B, so that the white balance can be adjusted after γ (gamma) correction. The WB circuit 207 converts the level of the pixel data of each color component R, G, B using a level conversion table input from the general controller 211. The conversion coefficient (or the slope of the characteristic line) for each color component in the level conversion table is set each photographed image by the general controller 211.

The γ correction circuit 208 corrects for the γ characteristic of the pixel data. The γ correction circuit 208 has, for example, six γ correction tables with different y characteristics, and uses the most appropriate γ correction table according to the photographed scene or the photographic conditions.

An image memory 209 stores the pixel data output from the γ correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the memory.

A VRAM 210 is a buffer memory for storing the image data which is to be reproduced and displayed on the LCD 10. The memory capacity of the VRAM 210 corresponds to the number of pixels of the LCD 10.

In the photographing preparation mode, each pixel data of the image taken by the photographing unit 3 every 1/30 seconds is subjected to the prescribed signal processing by the sequence from the A/D converter 205 to the γ correction circuit 208, and stored in the image memory 209. This pixel data is simultaneously transferred to the VRAM 210 via the general controller 211, and displayed on the LCD 10. The user can see the photographed object on the LCD 10. In the reproduction mode, the image read out from the memory card 8 is subjected to the prescribed signal processing by the general controller 211, which is then transferred to the VRAM 210, and displayed on the LCD 10.

A card I/F 212 is an interface for writing and reading image data into and from the memory card 8. A communication I/F 213 is an interface, for example, based on the USB standard, which allows the digital camera to be externally connected to the computer so as to communicate each other.

A flash control circuit 214 controls light emission of the built-in flash device 5. In particular, the flash control circuit 214 controls the quantity of flash light, flash timing, and so on, based on the control signal supplied from the general controller 211. The flash control circuit 214 also brings the light emission to zero based on the flash stop signal STP input from the light-quantity adjusting circuit 304.

An RTC (Real Time Clock) 219 is a time circuit for keeping the track of the date and time of each photograph, which is driven by a separate power source (not shown).

An operation unit 250 has switches corresponding to the UP key 6, the DOWN key 7, the shutter button 7, the FL mode setting key 11, the compression rate setting key 12, and the photographing/reproduction mode setting switch 14.

The general controller 211 comprises a microcomputer, and it organically controls the driving timing of each element in the photographing unit 3 and the main body 2 so as to generally control the photographing operation of the digital camera 1.

If in the photographing mode the shutter button 9 is pressed to start photographing, the general controller 211 creates tag information (such as the frame number, exposure value, shutter speed, compression rate K, photographing date and time, flash ON/OFF data, scene information, image determination result, etc), store the tag information in the memory card 8, together with the thumb nail image created from the image taken in the image memory 209 after the start of the photographing operation, and the compressed image created by a JPEG method at a predetermined compression rate K.

The memory card 8 can store forty frames of images taken by the digital camera 1 at a compression rate of 1/20. Each of the frames has tag information, high-resolution image data (640×480 pixels) compressed by a JPEG method, and thumb nail image data (80×60 pixels). Each frame may be treated as an image file of, for example, an EXIF format.

<Overall Structure of the Digital Camera System>

Figure 5:
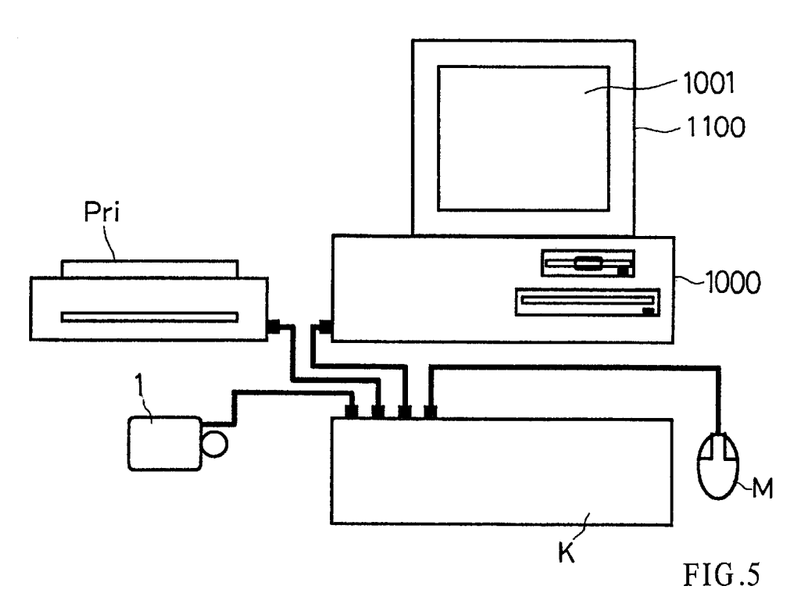
FIG. 5 illustrates the overall structure of the digital camera system according to the embodiment of the present invention.

FIG. 5 illustrates the overall structure of the digital camera system.

A digital camera 1 is connected to a desktop type personal computer 1000. A keyboard K and a mouse M, which are manipulation devices for the computer 1000, and a printer Pri are also connected to the computer 1000 via USB cables. The personal computer 1000 has a display 1100 which comprises, for example, a CRT or LCD. The display 1100 displays various images in connection with the operations of the digital camera 1. The keyboard K can function as a hub of the USB interface, other than its original function. A driver software for the digital camera, that is, a computer program, is installed in the personal computer 1000 in advance. The driver software may be installed in the personal computer 1000 via a recording medium, such as a CD-ROM. The driver software can be transferred from the server to the computer 1000 via the network, and installed in the computer 1000. The driver software includes those supplied form as compressed, combined, or divided files from the media or the server. The driver software also includes those modified to executable forms during or after the installation in the computer 1000.

Figure 6:
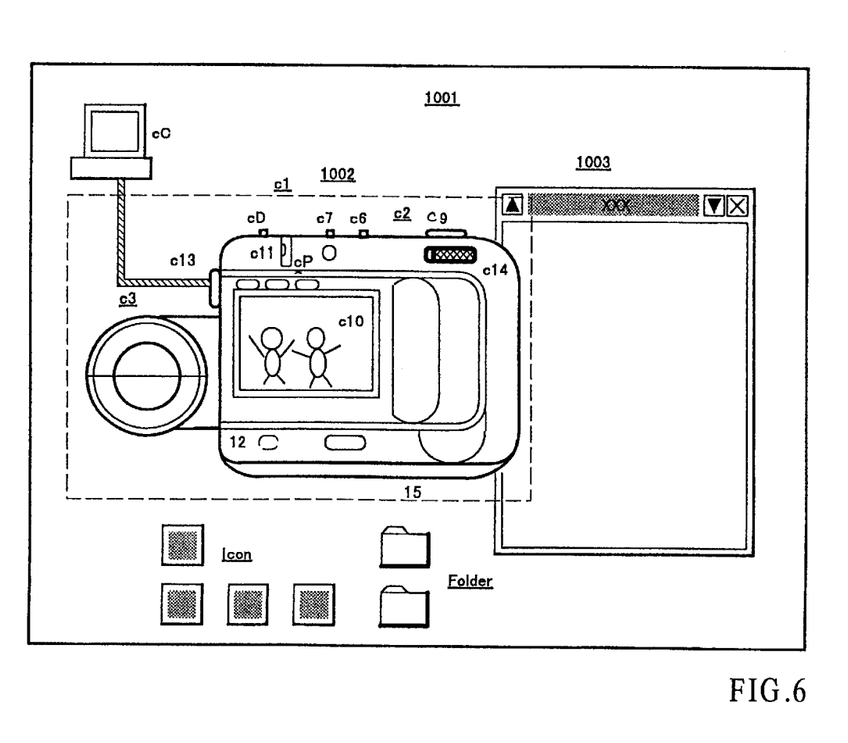
FIG. 6 illustrates an example of the display screen of the personal computer which displays the picture of the digital camera when the digital camera is connected to the personal computer.

If the digital camera 1 is connected to the USB port of the keyboard K when the personal computer is on, the personal computer detects the connection with the digital camera, and activates the installed driver for the digital camera 1. Then, the driver window 1002, which is indicated by the dashed line in FIG. 6, is displayed over the previously opened window 1003 on the monitor screen 1001 of the personal computer 1000. Many icons, including data and application icons "Icon", folder icons "Folder", and the icon "cC" representing the personal computer 1000 itself, are also displayed on the monitor screen 1001.

As shown in FIG. 6, the rear view of the digital camera 1 is displayed in the driver window 1002, as if the digital camera 1 exists before the user. The user can manipulate the digital camera via this picture.

An Up key c6 and a Down key c7, which are used to advance forward and backward the frames of the recorded images during the reproduction, are provided in the middle of the top face of the digital camera. A delete switch cD for deleting the images recorded in the memory card 8 is provided on the left side of the Down key c7. A shutter button c9 is provided on the right side of the Up key c6, and an FL mode setting key c11 is provided below the Down key c7. By clicking these keys in the driver window 1002 using a mouse, the user can manipulate the digital camera 1, as if the user actually presses the keys on the real digital camera 1. A display c10, which correspond to the display 10 of the actual digital camera 1, is also shown in the driver window 1002, and the same image as that displayed on the actual display 10 is displayed on the display screen c10 in the driver window 1002.

<Control Operation during Connection of Camera>

Figure 7:
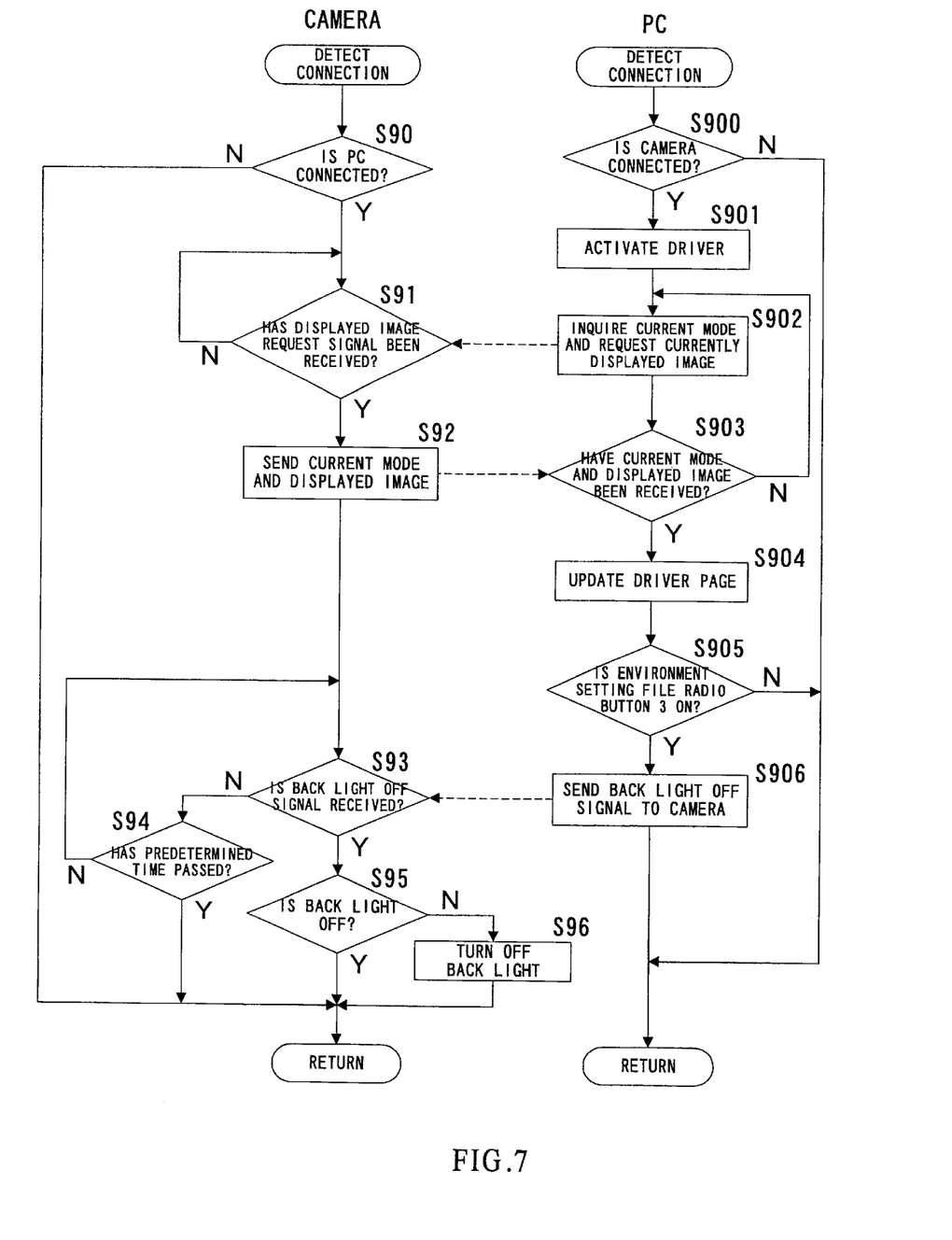
FIG. 7 is a flowchart showing the control operation performed when the digital camera is connected to the personal computer.

FIG. 7 is a flowchart showing the control operation performed when the digital camera 1 is connected to the personal computer 1000.

When the personal computer 1000 detects the connection with the digital camera 1 in S900, the driver is activated in S901.

Then, in S902, the personal computer 1000 outputs a display image request signal to the digital camera 1 to cause the digital camera 1 to send the image data being currently displayed on the display 10 of the digital camera 1 to the personal computer 1000, and at the same time, inquiring the current mode of the digital camera 1, the photographing mode or the reproduction mode.

On the digital camera side, if the change of status due to the connection to the personal computer (PC) 1000 is detected in S90, the digital camera 1 waits for the displayed image request signal supplied from the personal computer 1000 in S91. If the digital camera 1 receives the displayed image request signal (YES in S91), the digital camera 1 transmits the current mode (the photographing mode or the reproduction mode) to the personal computer, and simultaneously, starts transferring the image being displayed on the display 10 of the digital camera 1 to the personal computer 1000 in S92.

The personal computer waits for the current mode and the currently displayed image data transmitted from the digital camera 1 in S903. If the personal computer 1000 receives the current mode and the image data from the digital camera 1 (YES in S903), the personal computer 1000 updates the page of the driver window in S904. From this point, the image being displayed on the display 10 of the digital camera 1 is continuously displayed on the virtual display c10 in the driver window 1002 unless the driver window 1002 is manipulated via the personal computer 1000. Actually, the digital camera 1 is connected to the personal computer 1000 via the USB cable. Accordingly, when the connection between the digital camera 1 and the personal computer 1000 is confirmed, the image of the cable c13 extending between the icon cC representing the computer itself and the driver window 1002 is also displayed on the monitor screen 1001 of the personal computer 1000 (See FIG. 6).

Next, the personal computer determines in S905 if the radio button 3 is ON in the environment setting file of the driver, the details of which will be described below. The ON state of the radio button 3 indicates that the user wishes to turn off the back light of the display 10 of the digital camera 1 during the connection of the digital camera 1 with the personal computer 1000. If the radio button 3 is selected (YES in S905), a back light OFF signal is output from the personal computer 1000 to the digital camera 1 in S906. If the radio button 3 is not selected (NO in S905), this routine terminates.

The digital camera 1 waits for the back light OFF signal in S93 and S94. If the digital camera does not receive the back light OFF signal even after a predetermined time has passed (YES in S94), this routine terminates. If the back light OFF signal was received by the digital camera 1 (YES in S93), it is determined in S95 if the back light has already been turned off. If the back light has not been turned off (NO in S95), the back light is turned off in S96. In this case, not only the back light, but also the LCD itself may be turned off.

The reason for turning off the back light is to save the power of the battery of the digital camera 1 because the user can now watch the image currently displayed on the digital camera 1 in the driver window 1002 on the monitor screen of the personal computer 1000.

<Environment Setting File of Driver>

The environment setting file of the driver will be explained in more detail.

Figure 8:
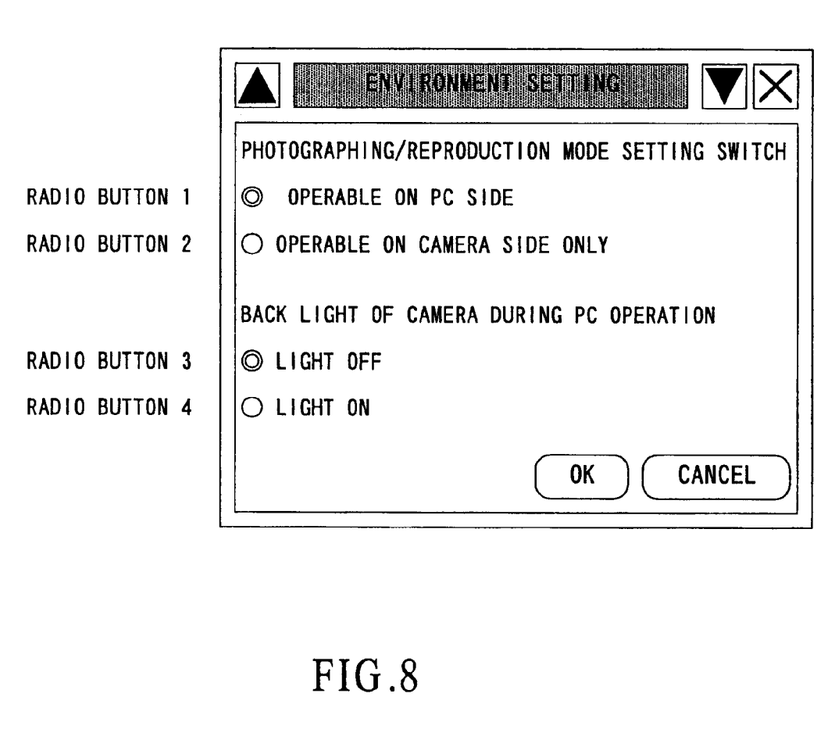
FIG. 8 illustrates an example of the environment setting window of the driver software of the personal computer.

FIG. 8 illustrates the environment setting window of the driver. This window shows two pairs of radio buttons (buttons 1 and 2, and buttons 3 and 4), an OK button, and a cancel button. Similar to other windows, the symbol ▼ (upward triangle) is the maximizing button, ▲ (downward triangle) is the minimizing button, and × (cross) is the close button. The environment setting window is opened by clicking the grip of the digital camera displayed in the driver window 1002 using the mouse, and is closed if the OK button or the cancel button is clicked, or if the close button is clicked.

Through this window, the user can manipulate the photographing/reproduction mode setting switch 14 and the back light of the display 10 of the digital camera 1 when the digital camera 1 is in connection with the personal computer 1000. Under the photographing/reproduction mode setting switch, there are two options, "operable on the PC side" and "operable on the digital camera side only".

If the radio button 1, which represent "operable on the PC side", is selected, the photographing mode and the reproduction mode can be switched every time the photographing/reproduction mode setting switch c14 is clicked in the driver window 1002 using the mouse. Upon switching the mode, the types and positions of switches displayed in the window also change. The user can also set the mode from the digital camera 1 if the radio button 1 is selected. Regardless of whether the mode is set by the digital camera 1 or the personal computer 1, the last selected mode becomes the current mode. If the mode is switched on the digital camera 1, the switching result is displayed in the driver window. However, if the mode is switched on the personal computer 1000, the result can not be reflected in the status of the mode setting switch 14 of the digital camera 1 because the mode setting switch 14 of the digital camera in this embodiment is a mechanical slide switch.

Figure 10:
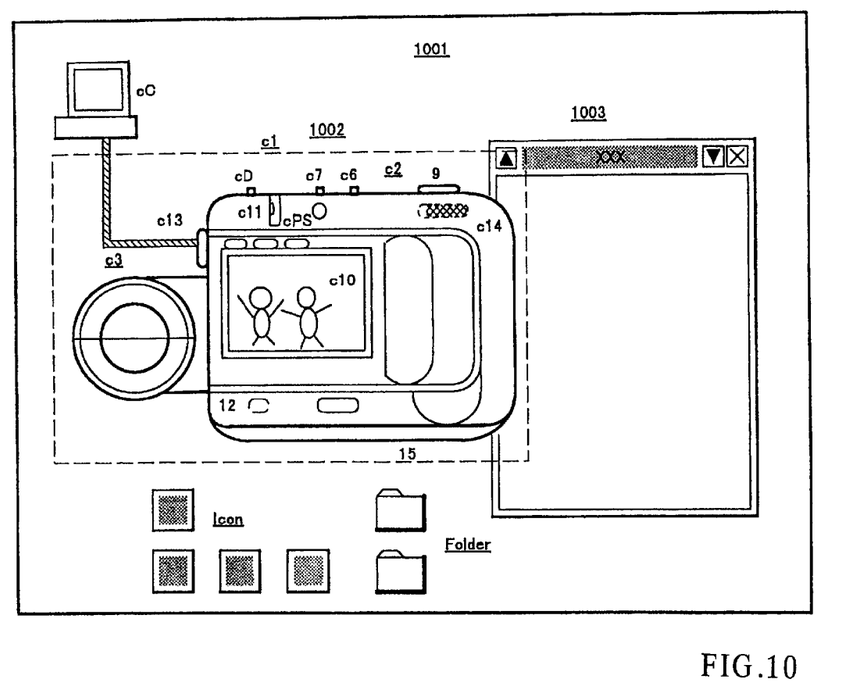
FIG. 10 illustrates an example of the updated display screen of the personal computer after the driver window was updated.

If the radio button 2, which represent "operable on the digital camera side only", is selected, the photographing/ reproduction mode setting switch c14 displayed in the driver window 1002 is paled (or disabled), as shown in FIG. 10. In this state, even if the mode setting switch c14 is clicked, it does not work. However, any change in the actual mode setting key 14 of the digital camera 1 is reflected in the displayed mode setting switch c14, so that the user can confirm the current mode set by the digital camera 1 on the driver window 1002 although the photographing/reproduction mode setting switch c14 in the driver window 1002 is disabled.

Next, under the setting of "back light of the digital camera during the connection with PC", there are two options, light ON and light OFF. If the radio button 3 (i.e., the OFF state) is selected, the back light of the display 10 of the digital camera 1 is automatically turned off when the digital camera 1 is connected to the personal computer 1000. If the radio button 4 (i.e., the ON state) is selected, the back light is continuously in the ON state even if the digital camera 1 is connected to the personal computer 1000.

The default is the radio buttons 1 and 3.

Figure 9:
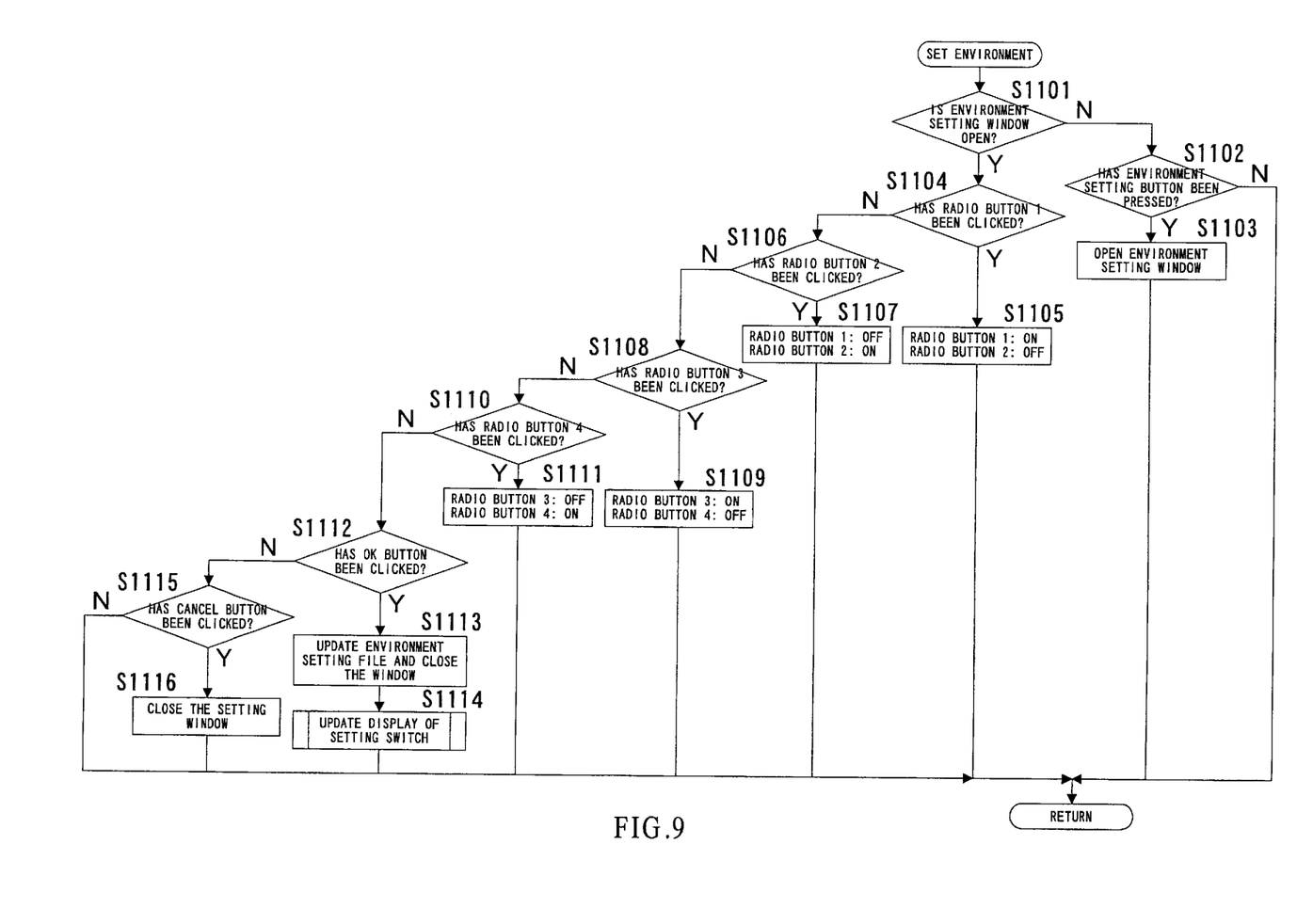
FIG. 9 is ,a flowchart showing the environment setting operation of the driver software of the personal computer.

FIG. 9 is a flowchart of the environment setting operation of the driver software performed by the personal computer 1000.

First, in S1101, it is determined if the environment setting window shown in FIG. 8 is already open. If the window has not been opened (NO in S1101), it is determined in S1102 if a command for opening the environment setting window has been input, that is, if the grip of the digital camera 1 displayed in the driver window has been clicked. If no command for opening the environment setting window was input (NO in S1102), this routine terminates. If the command was input (YES in S1102), the environment setting window is opened in S1103.

If the environment setting window is already open in the determination of S1101 (YES in S1101), it is then determined in S1104 if the radio button 1 displayed in the environment setting window has been clicked. If the radio button 1 was clicked (YES in S1104), the radio button 1 is turned on, while the radio button 2 is turned off, in S1105.

If the radio button 1 is not clicked in S1104 (NO in S1104), it is further determined in S1106 if the radio button 2 has been clicked. If the radio button 2 was clicked (YES in S1106), then the radio button 1 is turned off, while the radio button 2 is turned on in S1107.

If in S1106 the radio button 2 is not clicked (NO in S1106), it is further determined in S1108 if the radio button 3 has been clicked. If YES in S1108, the radio button 3 is turned on, while the radio button 4 is turned off in S1109.

If the radio button 3 is not clicked in S1108 (NO in S1108), it is further determined in S1110 if the radio button 4 has been clicked. If the radio button 4 was clicked (YES in S1110), then the radio button 3 is turned off, while the radio button 4 is turned on in S1111.

If the radio button 4 is not clicked in S1110 (NO in S1110), it is determined in S1112 if the OK button has been clicked. If YES in S1112, the environment setting file is update in S1113, and then the environment setting window is closed. The display of the setting switch in the driver window is also updated in S1114, and the page of the driver window and the status of the back light of the digital camera 1 are controlled according to the conditions set in the environment setting window. To be more precise, the current status is compared with the new conditions, and the page of the drive window is updated, for example, as shown in FIG. 10, and the back light of the digital camera 1 is turned on if requested.

If in S1112 the OK button is not clicked (NO in S1112), it is determined in S1115 if the cancel button has been clicked. If YES in S1115, all the previous commands are invalidated and the environment setting window is closed in S1116. If the cancel button is not clicked (NO in S1115), this routine terminates.

<Photographing/Reproduction Mode Switching Operation>

Figure 11:
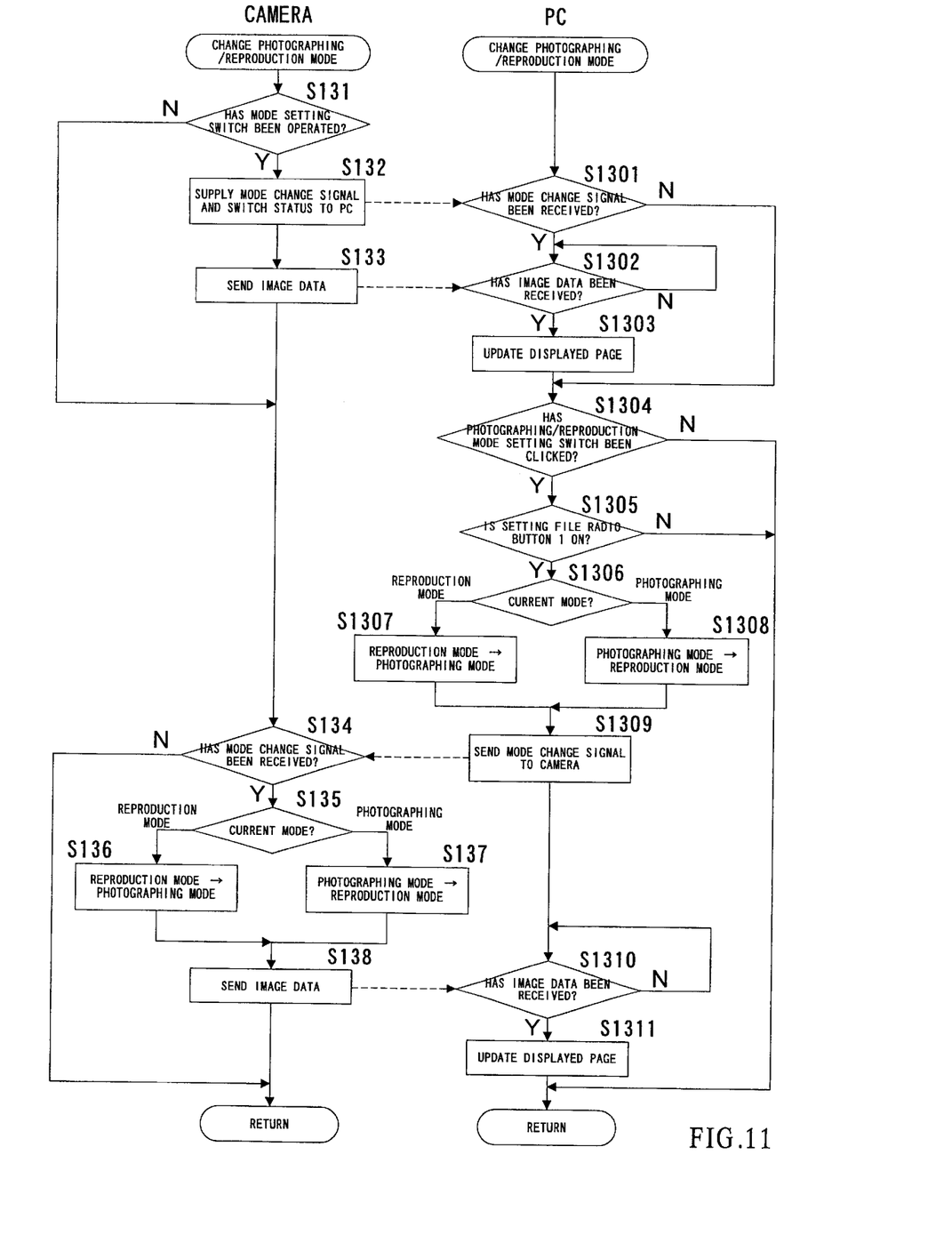
FIG. 11 is a flowchart showing the operations for switching the mode of digital camera between the photographing and reproduction modes.

FIG. 11 is a flowchart showing the mode switching operation for the digital camera 1 between the photographing mode and the reproduction mode.

The mode of the digital camera can be switched from either the camera side or the computer side. First, the switching of the photographing/reproduction mode setting switch 14 of the digital camera 1 will be explained.

As has been described, the photographing/reproduction mode setting switch 14 is a slide switch in this embodiment. If the switch 14 is manipulated to switch the mode (YES in S131), a mode change signal is transmitted to the personal computer 1000 in order to inform the most current mode in S132, and the image data which is to be displayed on the display 10 of the digital camera 1 is transferred to the personal computer 1000 in S133.

The personal computer 1000 waits for the mode change signal in S1301. If the mode change signal was received (YES in S1301), the computer further waits for the image data which is to be displayed on the display 10 of the digital camera 10 in S1302. If the image data was received (YES in S1302), the page of the driver window 1002 is updated in S1303. In other words, the position of the photographing/reproduction mode setting switch c14 displayed in the driver window is changed, and the image which is to be displayed on the actual display 10 of the digital camera 1 is also displayed on the display screen c10 in the driver window. Thus, whenever the photographing/reproduction mode setting switch 14 is manipulated on the digital camera 1, the manipulation result is automatically reflected in the driver window on the monitor screen of the personal computer 1000. Accordingly, the user need not manipulate on the computer to switch the mode on the monitor screen.

If in S1301 no mode change signal is received (NO in S1301), the process jumps to S1304 for switching the mode on the computer side.

As the other option, the mode of the digital camera 1 can be switched on the computer side. In this case, it is determined in S1304 if the photographing/reproduction mode setting switch c14 displayed on the driver window has been clicked. If the displayed switch c14 was clicked (YES in S1304), it is determined in S1305 if the radio button 1 of the environment setting file is in the ON state, that is, if the mode setting operation is allowed on the computer side. If the mode setting is available on the computer side, i.e., if the radio button 1 is ON (YES in S1305), the current mode is checked in S1306. If the current mode is the reproduction mode, the process proceeds to S1307, in which the mode is switched to the photographing mode. If the current mode is the photographing mode in S1306, the process proceeds to S1308, in which the mode is changed to the reproduction mode. Then, the mode change signal is returned to the digital camera 1 in S1309.

If in S1304 the photographing/reproduction mode setting switch c14 is not clicked (NO in S1304), and if in S1305 the radio button 1 of the environment setting file is not ON, (that is, the mode setting manipulation is not allowed on the computer side), the routine terminates in either case.

In S134, it is determined if the digital camera has received the mode change signal. If the camera received the mode change signal (YES in S134), the current mode is checked in S135. If the current mode is the reproduction mode, the mode is changed to the photographing mode in S136. If the current mode is the photographing mode, the mode is changed to the reproduction mode in S137. Then, the image data of the currently displayed picture is transferred to the personal computer in S138. In this way, the mode setting operation through the personal computer is given priority independent of the position of the mode setting switch 14 of the digital camera.

The personal computer waits for the image data in S1310. If the image data was received (YES in S1310), the page of the drive window 1002 is updated in S1311, so that the position of the photographing/reproduction mode setting switch c14 is changed in the driver window, and that the image being displayed on the display 10 of the digital camera 1 is also displayed on the display screen c10 in the driver window on the monitor screen of the personal computer. Since the current state of the display 10 of the digital camera 1 is displayed on the monitor screen of the personal computer, the user need not check the display 10 of the digital camera 1 when changing and setting the mode of the camera through the computer.

<Disconnection of the Digital Camera from PC>

Figure 12:
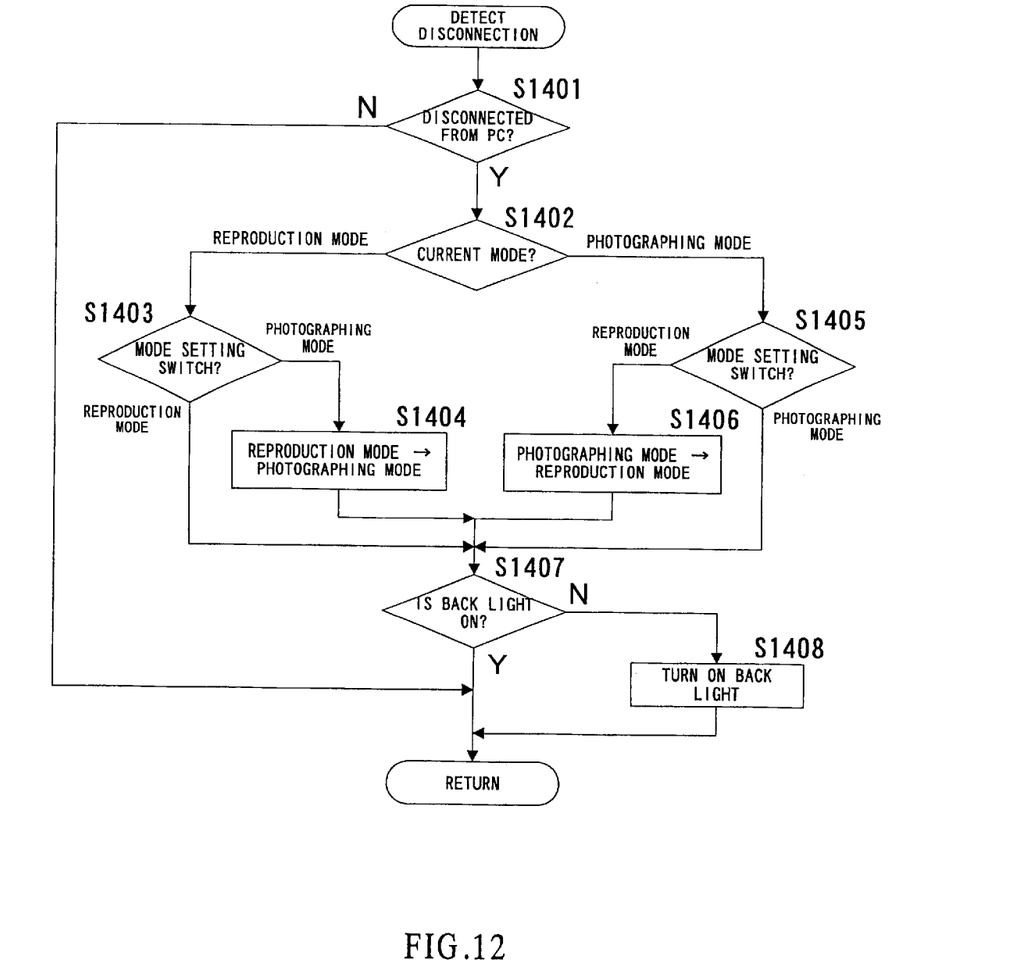
FIG. 12 is a flowchart showing the operations performed by the digital camera when the digital camera is disconnected from the personal computer.

FIG. 12 is a flowchart showing the operation performed on the digital camera side when the digital camera 1 is disconnected from the personal computer 1000.

First, in S1401, it is determined if the digital camera 1 has been disconnected from the personal computer. If the camera is still in the connected state (NO in S1401), this routine terminates. If the camera was disconnected (YES in S1401), the current mode of the digital camera 1 is detected in S1402. If the current mode is the reproduction mode in S1402, the process proceeds to S1403, in which the actual state of the mode setting switch 14 of the digital camera 1 is checked. If the mode setting switch 14 is set to the photographing mode, the mode of the digital camera 1 is changed to the photographing mode in S1404.

If in S1402 the current mode of the digital camera is photographing mode, the process proceeds to S1405, in which the actual state of the photographing/reproduction mode setting switch 14 is checked. If the mode setting switch 14 is set to the reproduction mode, the mode of the digital camera 1 is changed to the reproduction mode in S1406.

As has been explained earlier, as long as the digital camera 1 is in connection with the personal computer 1000, the operation mode of the digital camera 1 can be set on either the digital camera side or the computer side. However, because the mode setting switch 14 of the digital camera 1 is a mechanical type slide switch, the current operation mode designated by the user via the computer may disagree with the actual position of the photographing/reproduction mode setting switch 14. In such a case, the user may be confused when the digital camera 1 is disconnected from the personal computer. In order to avoid the confusion, the operation shown in FIG. 12 is performed so that the currently designated mode is coincident with the position of the photographing/reproduction mode setting switch 14.

Next, in S1407, it is determined if the back light of the display 10 is in the ON state. Even if the currently designated mode is in agreement with the position of the mode setting switch 14 in S1403 and S1405, the process also proceeds to S1407. If the back light is off (NO in S1407), the back light is turned on in S1408. The back light may be off if the digital camera 1 is in connection with the personal computer 1000; however, once the digital camera 1 is disconnected from the personal computer 1000, the OFF state of the back light is hardly distinguished from the power off state of the digital camera 1. Therefore, the back light is preferably turned on when the digital camera 1 is disconnected from the computer 1000 in order to avoid the confusion. In the digital camera 1 according to the embodiment, the compression rate setting switch 12 is also a slide switch, similar to the mode setting switch 14. Therefore, the control operation for the photographing/reproduction mode setting switch 14 performed between the digital camera 1 and the personal computer 1000 may be applied to the compression rate setting switch 12. Although the manipulation device for manipulating the driver window on the monitor screen of the personal computer 1000 is the mouse in the embodiment, the keyboard may also be used as the manipulation device.

The terms and sentences in this specification are used only for exemplary purposes, and are not intended to limit the present invention. There are many modifications and substitutions without departing from the spirit and scope of the present invention, which is defined by the appended claims.

What is claimed is:

1. A camera system, comprising:
    a camera for photographing an object and acquiring image data of the object;
    a computer having a connector which allows said camera to be connected to said computer;
    a mode setting device provided to said camera and for setting an operation mode of the camera by being manipulated;
    a display which functions together with said computer; and
    a controller provided to said computer, said controller detecting a connection between said camera and said computer via said connector, and causing an image representing said mode setting device and an image representing a display panel for displaying the image taken by said camera to be displayed on said display upon detection of the connection,
    wherein when said computer is manipulated for setting a mode through the image representing said mode setting device, said controller supplies an instruction signal for setting the selected mode to the camera, and
    wherein said camera sets the mode in response to the instruction supplied from said controller.

2. The camera system according to claim 1, wherein when setting a mode, one mode is selected from among a plurality of operation modes.

3. The camera system according to claim 1, wherein the image representing the display panel is changed when said computer is manipulated for setting a mode based on the image representing said mode setting device.

4. The camera system according to claim 1, wherein said camera has a monitor for displaying the image photographed by said camera, and back light of said monitor is disabled when said camera is connected to said computer.

5. The camera system according to claim 1, wherein said mode setting device is a mode setting switch shifted between different positions according to the mode selected, and wherein if the instruction for setting a mode is supplied from said computer, the operation mode is set to the selected mode regardless of the position of said mode setting switch.

6. The camera system according to claim 5, wherein when disconnection between said camera and said computer is detected, the mode is set according to the position of said mode setting switch.

7. The camera system according to claim 1, wherein when said mode setting device is manipulated, the manipulation result is transferred to said computer, whereby the image representing said mode setting device displayed on the display is changed.

8. The camera system according to claim 7, wherein when said mode setting device is manipulated, a mode is set in said camera based on the manipulation result.

9. A camera, comprising:
   a photographing unit for photographing an object and acquiring image data of the object;
   a display for displaying an image photographed by said photographing unit;
   a connector for allowing said camera to be connected to a computer;
   a mode setting device for setting an operation mode of said camera by being manipulated; and
   a controller for transmitting data regarding the operation mode set by said mode setting device and image data being displayed on said display when a data request signal sent from said computer was received, and for setting the operation mode of said camera based on an instruction from said computer regardless of the mode setting status of said mode setting device, said instruction resulting from manipulating said computer to set the mode through an image representing said mode setting device displayed on a display of said computer.

10. The camera according to claim 9, wherein said mode setting device sets a mode by selecting a mode from among a plurality of operation modes.

11. The camera according to claim 9, further comprising a monitor for displaying an image based on the image taken by said camera, wherein when said camera is connected to said computer, back light of said monitor is disabled.

12. The camera according to claim 9, wherein said mode setting device is a switch held at different positions depending on the selected mode, and when said camera receives the instruction from said computer, said controller sets a mode according to the instruction regardless of the position of said switch.

13. The camera according to claim 12, wherein when it is detected that said camera is disconnected from said computer, the operation mode is set again according to the position of said switch.

14. A system for connecting a camera to a computer, comprising:
   a camera for photographing an object and acquiring image data of the object;
   a connector provided to said camera and allowing said camera to be connected to said computer;
   a mode setting device provided to said camera and for setting an operation mode of said camera by being manipulated; and
   a medium storing a program for causing said computer to:
     detect a connection of said camera with said computer;
     display, upon detection of the connection of said camera with said computer, an image representing said mode setting device and an image representing a display panel for displaying the image data acquired by said camera on a display which functions in association with said computer; and
     output a mode setting instruction signal to said camera when said computer is manipulated through the image representing said mode setting device,
   wherein said camera sets its operation mode based on the instruction supplied from said computer.

15. The system according to claim 14, wherein said camera sets the operation mode by selecting one mode from among a plurality of operation modes.

16. The system according to claim 14, wherein said program further causes said computer to change the contents of the image representing said display panel displayed on said display when said computer is manipulated through said image representing said mode setting device.

17. The system according to claim 14, wherein said camera has a monitor for displaying an image based on the image data taken by the camera, and said monitor is disabled when said camera is connected to said computer.

18. The system according to claim 14, wherein said mode setting device is a switch held at a different position depending on the selected mode, and said camera sets its operation mode based on the instruction from said computer when the instruction signal was received, regardless of the position of said switch.

19. The system according to claim 18, wherein when it is detected that said camera is disconnected from said computer, the operation mode of said camera is set again according to the position of said switch.

20. The system according to claim 14, wherein if said mode setting switch is manipulated, the manipulation result is transferred to said computer, and wherein said program causes the computer to change the image representing said mode setting device displayed on said display.

21. The system according to claim 20, wherein when said mode setting device is manipulated, said camera sets its operation mode based on said manipulation result.

22. A computer program product based on which a computer executes the steps of:
   detecting a connection of a camera with the computer;
   displaying, upon detecting the connection of said camera with said computer, an image representing a mode setting device of the camera for setting an operation mode of the camera by being manipulated and an image representing a display panel for displaying image data acquired by the camera on a display which functions in association with the computer; and
   outputting a mode setting instruction signal to the camera when the computer is manipulated through the image representing the mode setting device.

23. The computer program product according to claim 22, wherein the operation mode is set by selecting one mode from among a plurality of operation modes.

24. The computer program product according to claim 22, wherein the program further causes the computer to change the contents of the image representing the display panel displayed on the display when the computer is manipulated through the image representing the mode setting device.

25. The computer program product according to claim 22, wherein when the mode setting device of the camera is manipulated, the manipulation result is transferred to the computer, and wherein the program causes the computer to change the image representing the mode setting device displayed in the display.

26. A computer, comprising:
   manipulation devices;
   a connector connectable to a camera which photographs an object to acquire image data of the object; and
   a controller for detecting a connection between the camera and said computer, and causing an image representing a mode setting device provided to said camera for setting an operation mode by being manipulated and an image representing a display panel for displaying the image taken by said camera to be displayed on a display functioning in association with said computer when the connection was detected, wherein when said computer is manipulated for setting a mode based on the image representing said mode setting device, said controller supplies an instruction for setting the mode to said camera.

27. The computer according to claim 26, wherein the operation mode is set by selecting one mode from among a plurality of operation modes.

28. The computer according to claim 26, wherein the image representing said display panel is changed when said computer is manipulated in order to set an operation mode through the image representing said mode setting device.

29. The computer according to claim 26, wherein if said mode setting device of said camera is manipulated on said camera side, the manipulation result is transferred to said computer, and the image representing said mode setting device displayed on said display is changed based on the manipulation result.

30. A system for connecting a camera to a computer, comprising:

a camera for photographing an object and acquiring image data of the object;

a connector provided to said camera and allowing said camera to be connected to said computer;

a mode setting device provided to said camera and for setting an operation mode of said camera by being manipulated; and a medium storing a program for causing said computer to:

detect a connection of said camera with said computer;

display an image representing said mode setting device and an image representing a display panel for displaying the image data acquired by said camera on a display which functions in association with said computer; and output a mode setting instruction signal to said camera when said computer is manipulated through the image representing said mode setting device, wherein said camera sets its operation mode by selecting one mode from among a plurality of operation modes based on the instruction supplied from said computer.

31. A computer program product based on which a computer executes the steps of:

detecting a connection of a camera with the computer;

displaying an image representing a mode setting device of the camera for setting an operation mode of the camera by being manipulated and an image representing a display panel for displaying image data acquired by the camera on a display which functions in association with the computer; and outputting a mode setting instruction signal to the camera when the computer is manipulated through the image representing the mode setting device, wherein the operation mode is set by selecting one mode from among a plurality of operation modes.

* * * * *